United States Patent [19]

Neuhaus

[11] 4,145,226

[45] Mar. 20, 1979

[54] INK REMOVER

[76] Inventor: Melvin A. Neuhaus, 703 Oban, San Antonio, Tex. 78216

[21] Appl. No.: 838,155

[22] Filed: Sep. 30, 1977

[51] Int. Cl.$^2$ .......................... C09K 3/00; D21C 3/20
[52] U.S. Cl. .................................... 106/287.24; 8/69; 8/102; 106/311; 162/5
[58] Field of Search ................... 106/287, 311, 287.24; 162/5; 252/170–172; 134/38; 8/137

[56] References Cited

U.S. PATENT DOCUMENTS

| | | | |
|---|---|---|---|
| 1,993,362 | 3/1935 | Crisp | 162/5 |
| 3,377,234 | 4/1968 | Illingworth | 162/5 |
| 3,392,083 | 7/1968 | Illingworth | 162/5 |
| 3,775,334 | 11/1973 | Christie | 252/170 |

*Primary Examiner*—Theodore Morris
*Attorney, Agent, or Firm*—John C. Stahl

[57] ABSTRACT

A water-miscible ink remover comprising a glycol ether, isopropyl acetate, and a liquid surfactant soluble in hydrocarbons.

8 Claims, No Drawings

INK REMOVER

BACKGROUND OF THE INVENTION

This invention relates to a composition for removing inks, namely, ball point, stamp pad, writing, duplicating, felt-tip and colored art inks, and many other stains from natural and synthetic fabrics without fading of fast colors and damage to such materials.

DESCRIPTION OF PRIOR ART

Compositions for removing inks normally used in ball point pens from fabrics are commercially available. These products are relatively inefficient in removing such stains and after treating the stain the immediate area must be kept moist and the entire garment or the like washed or dry cleaned.

SUMMARY OF THE INVENTION

It is therefore the primary object of the invention to provide a water-miscible composition adapted to remove ink and many other stains from natural and synthetic fabrics without fading of fast colors and damage to such fabrics.

Another object is to provide such a composition which easily removes inks and many other stains, and is relatively inexpensive in cost.

Other objects and features of the invention will become apparent to those skilled in the art from a consideration of the following specification.

PREFERRED EMBODIMENTS OF THE INVENTION

In accordance with the principles of my invention I employ a glycol ether such as diethylene glycol monoethyl ether or diethylene glycol diethyl ether; an ester such as isopropyl acetate, preferably 85%-99% pure; and a liquid surfactant such as alkyl aryl sulphonate or other surfactant which is soluble in hydrocarbons.

Henceforth throughout the specification, the term "parts" refers to parts by volume. Particular preferred compositions according to the present invention that have been found to have excellent properties for removing inks and the like from fabrics as well as being relatively economical in use are those containing 35-75 parts diethylene glycol monoethyl ether or diethylene glycol diethyl ether; 23-55 parts isopropyl acetate, preferably 85%-99% pure; and 2-15 parts surfactant, such as alkyl aryl sulphonate, 85%-96% pure.

Example I

|  | Parts by volume |
|---|---|
| Diethylene glycol monoethyl ether or diethylene glycol diethyl ether | 35-75 |
| Isopropyl acetate, 85%-99% pure | 23-55 |
| Surfactant soluble in hydrocarbons, 85%-96% pure | 2-15 |

Example II

|  | Parts by volume |
|---|---|
| Diethylene glycol monoethyl ether | 60 |
| Isopropyl acetate, 99% pure | 33 |
| Alkyl aryl sulphonate, 96% pure | 7 |

In the formulation of Example II the isopropyl acetate should not exceed 33 parts by volume to avoid fading color-fast dyes or damage to some synthetic fabrics.

In practicing the process of the subject invention diethylene glycol monoethyl ethyl or diethylene glycol diethyl ether in the range heretofore specified is placed in a container and the liquid surfactant in the specified range introduced therein and thoroughly mixed. Isopropyl acetate, in the desired range, is then added to the container and the contents thoroughly mixed after which such composition may be packaged.

In use, the glycol ether and isopropyl acetate act as solvents for the inks and other stains and the surfactant allows rinsing of such dissolved inks or stains from the fabric with tap water at ambient temperature. Distilled water may be used for rinsing those materials that tend to water spot. One application of the ink or stain remover of the subject invention is normally used when the stain is not yet set. The user gently works the composition into the stained area, without excessive rubbing, after which the treated area is flushed with water. If the stain is set or of heavy deposit, more than one application may be required. The treated area is blotted after each such application to remove the loosened portion of the stain and excess moisture.

It should be understood, of course, that the foregoing disclosure relates to only preferred embodiments of the invention and that it is intended to cover all changes and modifications of the compositions herein chosen for the purpose of the disclosure which do not constitute departures from the spirit and scope of the invention.

What is claimed is:

1. An ink remover comprising
   a glycol ether selected from the group consisting of diethylene glycol monoethyl ether and diethylene glycol diethyl ether,
   isopropyl acetate, and
   a liquid surfactant soluble in hydrocarbons.

2. The invention of claim 1 wherein said glycol ether comprises 35-75 parts by volume, said isopropyl acetate comprises 23-55 parts by volume, and said surfactant comprises 2-15 parts by volume.

3. The invention of claim 1 wherein said isopropyl acetate is 85%-99% pure.

4. The invention of claim 1 wherein said surfactant is alkyl aryl sulphonate.

5. The invention of claim 4 wherein said alkyl aryl sulphonate is 85%-96% pure.

6. An ink remover comprising
   35-75 parts by volume diethylene glycol monoethyl ether,
   23-55 parts by volume isopropyl acetate, and
   2-15 parts by volume of a liquid surfactant soluble in hydrocarbons.

7. The invention of claim 6 wherein said surfactant is alkyl aryl sulphonate.

8. An ink remover comprising
   approximately 60 parts by volume diethylene glycol monoethyl ether,
   approximately 33 parts by volume isopropyl acetate, and
   approximately 7 parts by volume alkyl aryl sulphonate.

* * * * *